J. PEYRE.
VEHICLE DIRECTION INDICATOR.
APPLICATION FILED SEPT. 19, 1917.
1,288,669.
Patented Dec. 24, 1918.
2 SHEETS—SHEET 2.
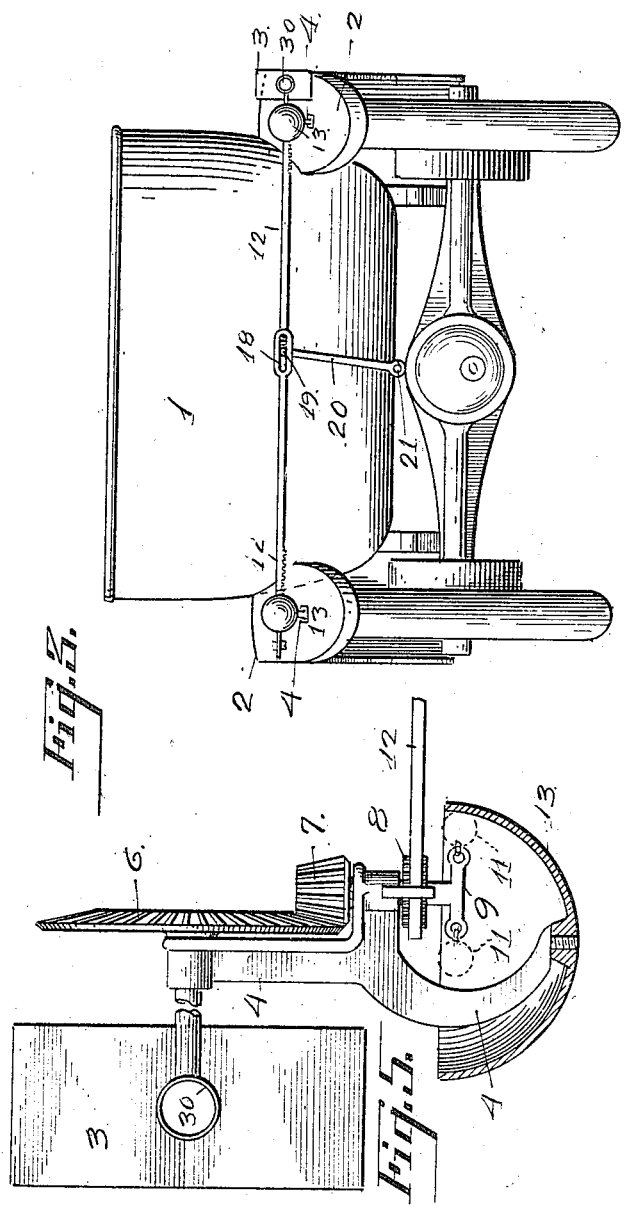
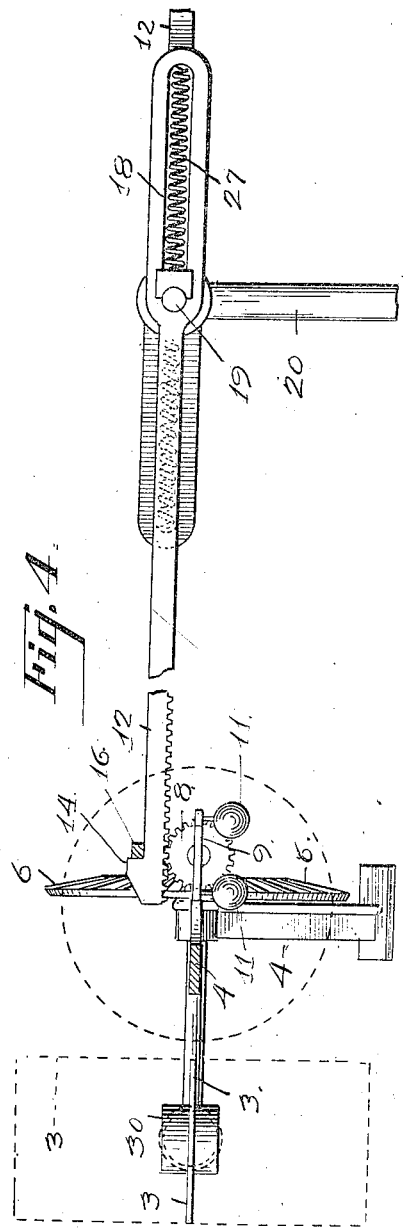
INVENTOR.
Jules Peyré.
BY
Arthur L. Slee
ATTORNEY.

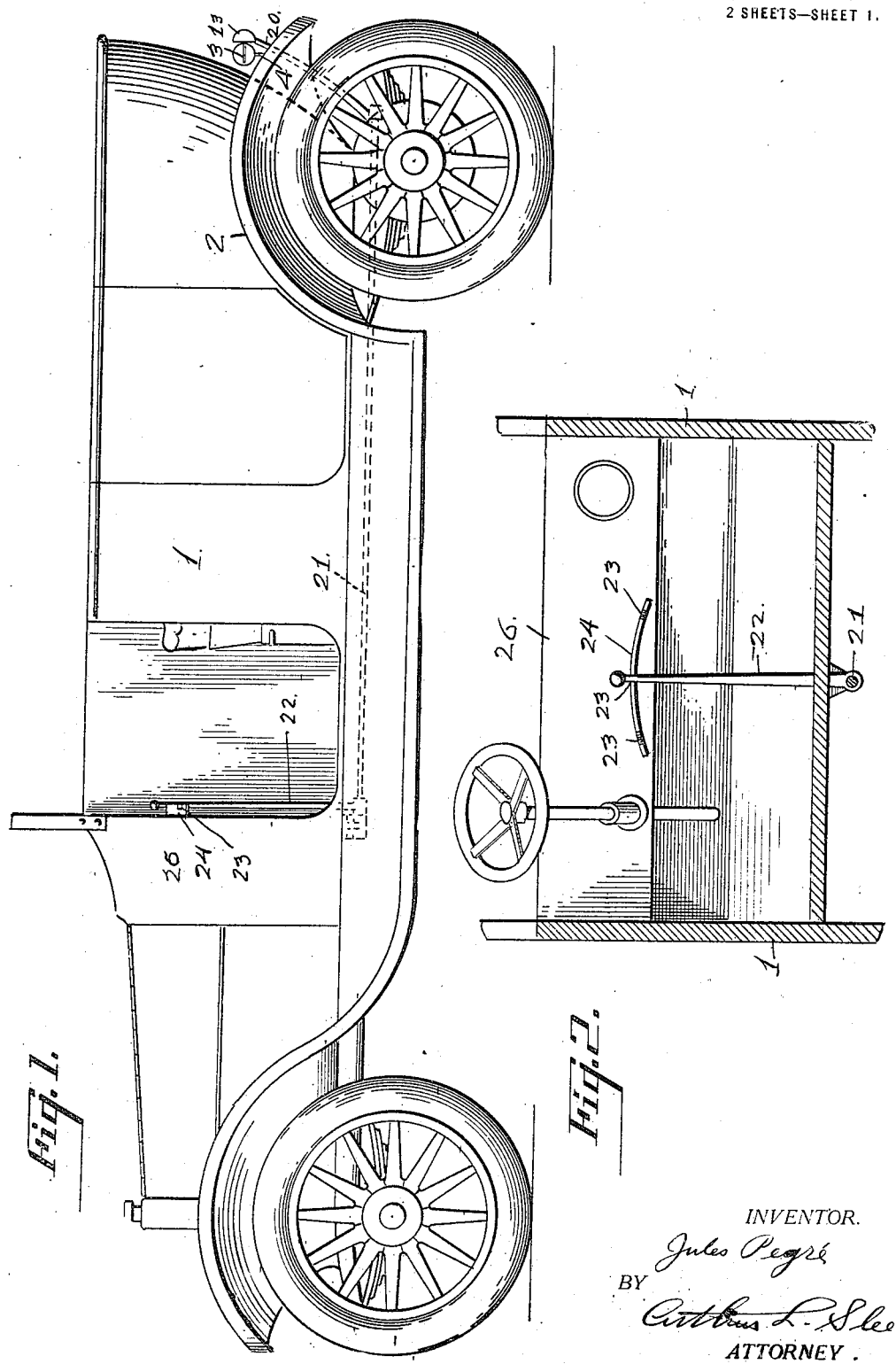

UNITED STATES PATENT OFFICE.

JULES PEYRÉ, OF SAN FRANCISCO, CALIFORNIA.

VEHICLE DIRECTION-INDICATOR.

1,288,669.  Specification of Letters Patent.  Patented Dec. 24, 1918.

Application filed September 19, 1917. Serial No. 192,419.

*To all whom it may concern:*

Be it known that I, JULES PEYRÉ, a citizen of the Republic of France, and a resident of the city and county of San Francisco and State of California, have invented a new and useful Improvement in Vehicle Direction-Indicators, of which the following is a specification.

My invention relates to improvements in vehicle direction indicators wherein a visible signal operates in conjunction with an audible alarm or signal to warn and indicate to following vehicles the direction in which the preceding vehicle is about to turn.

In the present state of the art many devices have been devised to indicate the direction in which the vehicle is about to turn but these devices are visible signals and there is nothing to attract the attention of following vehicles to the displayed signal.

An object of the present invention is to provide an improved visible signal consisting of a vertical signal plate exposed on that side of the vehicle adjacent to the direction in which the said vehicle is about to turn.

An audible alarm is operatively connected to the signal and said audible alarm is operated or sounded when the visible signal is exposed, to attract the attention of following vehicles.

A signal plate is placed upon each side of the vehicle and normally held in a horizontally disposed position so that only the thin edge of said plate is visible which at comparatively short distances is practically invisible. The plate may be colored red or any other suitable color and fitted with a lamp for night driving if desired.

Before making a turn the signal plate is rotated to a vertical position and an audible alarm is simultaneously sounded to attract the attention of following vehicles to the displayed signal.

I accomplish these objects by means of the device disclosed in the drawings forming a part of the present specification wherein like characters of reference are used to designate similar parts throughout the said specification and drawings and in which—

Figure 1 is a side elevation of a motor vehicle disclosing my improved device attached thereto;

Fig. 2 is a broken transverse sectional view of the device disclosing the arrangement of the operating lever;

Fig. 3 is a rear elevation of Fig. 1;

Fig. 4 is an enlarged broken view of one of the signals and the operating connections thereto, the bell or alarm being removed; and Fig. 5 is a plan view of one of the signals as disclosed in Fig. 4.

Referring to the drawings the numeral 1 is used to designate a motor vehicle provided with the usual rear fenders 2 upon each one of which is rotatably mounted a signal plate 3 by means of suitable brackets 4. A bevel gear 6 is secured to each signal plate 3 and meshes with a bevel pinion 7 also rotatably mounted within the brackets 4 and provided with a gear 8 and a rotating head 9 from the ends of which are suspended hammers 11, said hammers being arranged to be rotated and by centrifugal force caused to strike a bell 13 or other suitable alarm secured to each bracket 4.

A rack 13 is in mesh with each pinion 8 and is slidably held in engagement with said pinion 8 by means of suitable guides 16.

One end of each rack 13 is provided with a stop 14 to prevent said rack from being pulled through the guide 16.

The other end of the racks 13 are each provided with a slot 18 which slidably engages a pin 19 on the end of a lever 20 secured to the rear end of a longitudinally disposed rod or shaft 21. The front end of the shaft or rod 21 is provided with an operating lever 22 which extends upward through the foot board of the vehicle 1 and engages notches 23 within a sector 24 secured to the dash or cowl 25 of the vehicle 1 or in any other place convenient for the driver of said vehicle.

When the operating rod or lever 22 is in a neutral or inoperative position as disclosed in Fig. 2 of the drawings the lever 20 at the rear end of the rod 21 is in the position indicated in Fig. 4 of the drawings.

A spring 27 is interposed between the end of each slot 18 and the pin 19 of the lever 20 to normally retain the signal plates 3 in a horizontal or inconspicuous position as disclosed in Figs. 1 and 4 of the drawings.

The operation is as follows:

When the driver or operator of a vehicle intends to turn to the right he springs the lever 22 from the central notch 23 of the sector 24 and moves said lever 22 to the right and into the right hand notch 23.

This movement partially rotates the shaft or rod 21 and moves the lever 20 to the right as disclosed in Fig. 3 of the drawings. The pin 19 compresses the spring 27 in the left hand rack 13 as said rack is retained against further movement by means of the stop 14 on the opposite end of said rack 13 which is then engaging the guide 16.

As the lever 20 moves to the right the pin 19 engages the inner end of the slot 18 of the right hand rack 13 and moves said rack 13 to the right simultaneously rotating the pinions 8 and 7 which cause the arm or head 9 to swing the balls or hammers 11 against the bell or alarm 13 and also partially rotates the bevel gear 6 and the signal plate 3 to a vertical position to render the same conspicuous to following vehicles thereby indicating that the vehicle on which the signal has been displayed is about to turn to the right.

The simultaneous sounding of the audible alarm instantly attracts attention to the displayed signal.

By moving the lever 22 back to the central notch 23 of the sector 24 the right hand rack 13 is moved by the compression of the spring 27 and the pin 19 to return the plate or signal 3 to a normal or horizontal position.

A cylindrical well 30 may be provided on the signal plate 3 for the reception of an electric lamp so that said lamp will be masked when the plate 3 is in a horizontal position and exposed when in a vertical or operative position. In this manner the signal may be rendered conspicuous at night.

It is obvious from the foregoing that I have provided an improved audible and visible signal to indicate and attract attention to the direction in which the vehicle is about to turn.

Having thus described my invention what I claim as new and desire to secure by Letters Patent is—

1. In a vehicle direction indicator, the combination with a vehicle of a signal plate rotatably mounted upon each rear side of said vehicle; an audible alarm operatively connected to each signal plate and arranged to be operated when the signal plate is operated; a longitudinal rod rotatably mounted under the vehicle; a vertically disposed arm secured to the rear end of the rod; means operatively connecting the upper end of the arm with both signals whereby one signal only is operated when the upper end of the arm is moved in one direction and the remaining signal is operated when the arm is moved in the other direction; and means for partially rotating the longitudinal rod to move the arm in either direction to operate one of the signal plates and the audible alarm connected thereto.

2. In a vehicle direction indicator, the combination with a motor vehicle of a signal plate rotatably mounted on each rear side of the vehicle; an audible alarm operatively connected to each signal plate; a pinion operatively connected to each signal plate and to the audible alarm; a longitudinal rod rotatably mounted under the vehicle; a vertically disposed arm secured to the rear end of the rod; a rack meshing with each pinion and slidably connected to the upper end of the vertically disposed arm whereby one signal only may be operated when the said arm is moved in either direction; and means for partially rotating the longitudinal rod to move the arm and thereby operate one of the signal plates and the audible alarm connected thereto.

In witness whereof I hereunto set my signature.

JULES PEYRE.